(12) United States Patent
Aimasso et al.

(10) Patent No.: US 11,384,842 B2
(45) Date of Patent: Jul. 12, 2022

(54) HOLLOW POPPET VALVE AND MANUFACTURING METHOD THEREFOR

(71) Applicant: Eaton Intelligent Power Limited, Dublin (IE)

(72) Inventors: Alberto Aimasso, Rivoli (IT); Mario Filippo Caloiaro, Rivarolo C.se (IT); Luigi Lia, Turin (IT); Francesca Mancuso, Turin (IT); Manuel Ruscigno, Rivarolo (IT)

(73) Assignee: Eaton Intelligent Power Limited, Dublin (IE)

( * ) Notice: Subject to any disclaimer, the term of this patent is extended or adjusted under 35 U.S.C. 154(b) by 26 days.

(21) Appl. No.: 16/758,055

(22) PCT Filed: Oct. 22, 2018

(86) PCT No.: PCT/EP2018/078833
§ 371 (c)(1),
(2) Date: Apr. 22, 2020

(87) PCT Pub. No.: WO2019/081397
PCT Pub. Date: May 2, 2019

(65) Prior Publication Data
US 2021/0190212 A1 Jun. 24, 2021

(30) Foreign Application Priority Data

Oct. 26, 2017 (GB) ...................................... 1717642

(51) Int. Cl.
*F01L 3/14* (2006.01)
*F16K 1/38* (2006.01)
*B21K 1/22* (2006.01)

(52) U.S. Cl.
CPC ................ *F16K 1/385* (2013.01); *B21K 1/22* (2013.01)

(58) Field of Classification Search
CPC ............... F01L 3/14; B21K 1/22; F16K 1/385
(Continued)

(56) References Cited

U.S. PATENT DOCUMENTS

| 3,378,904 A | 4/1968 | Gisela et al. |
| 5,413,073 A | 5/1995 | Larson et al. |

(Continued)

FOREIGN PATENT DOCUMENTS

| CN | 1094123 A | 10/1994 |
| EP | 0619419 A1 | 10/1994 |

(Continued)

OTHER PUBLICATIONS

Original and Translation of DE 2727006 A1; Keylwert Johann; Dec. 21, 1978.*

(Continued)

*Primary Examiner* — Paul J Gray
(74) *Attorney, Agent, or Firm* — Mei & Mark LLP

(57) ABSTRACT

A poppet valve, in particular a hollow poppet valve, includes: a valve stem; a valve body having along a longitudinal axis, a first end with a neck portion to which the valve stem is coaxially arranged and having along a longitudinal axis a second end with a first conical contact face portion, the valve body including a cavity with a first opening towards the first end and a second opening towards the second end; and a valve cap coaxially arranged to the valve body on the second end for closing the second opening, the valve cap having a second conical contact face portion to form together with the first conical contact face portion a valve head contact face.

18 Claims, 2 Drawing Sheets

(58) Field of Classification Search
USPC .................... 123/188.3; 29/888.45, 888.451
See application file for complete search history.

(56) References Cited

U.S. PATENT DOCUMENTS

| | | | |
|---|---|---|---|
| 5,619,796 | A | 4/1997 | Larson et al. |
| 6,006,713 | A | 12/1999 | Gebauer |
| 2007/0040144 | A1 | 2/2007 | Abele et al. |
| 2011/0186000 | A1 | 8/2011 | Endo |
| 2012/0255175 | A1 | 10/2012 | Morii et al. |
| 2016/0356186 | A1 | 12/2016 | Inoue et al. |

FOREIGN PATENT DOCUMENTS

| | | |
|---|---|---|
| EP | 1070831 A2 | 1/2001 |
| EP | 2357326 A1 | 8/2011 |
| GB | 532184 A | 1/1941 |
| JP | S60228713 A | 11/1985 |
| JP | H07208127 A | 8/1995 |

OTHER PUBLICATIONS

Original of GB 511718 Al; Eaton Mfg Co; Aug. 23, 1939.*
International Search Report and Written Opinion for PCT/EP2018/078833; dated Jan. 18, 2019; pp. 1-8.

* cited by examiner

HOLLOW POPPET VALVE AND MANUFACTURING METHOD THEREFOR

CROSS-REFERENCE TO PRIOR APPLICATIONS

This application is a U.S. National Phase application under 35 U.S.C. § 371 of International Application No. PCT/EP2018/078833, filed on Oct. 22, 2018, and claims benefit to British Patent Application No. GB 1717642.1, filed on Oct. 26, 2017. The International Application was published in English on May 2, 2019 as WO/2019/081397 under PCT Article 21(2).

FIELD

The invention relates to a poppet valve, in particular a hollow poppet valve. Poppet valves are for example used in combustion engines to open and close the inlet and outlet ports to the cylinders. As the power of combustion engines increases, the heat production also increases. To this end it is known to provide hollow poppet valves, which are filled with for example sodium for better heat exchange.

BACKGROUND

In order to maximize the heat exchange of hollow poppet valves and with the aim of reducing knocking tendency of gasoline engines, the cavity in the valve head should be as large as possible. A number of manufacturing methods are known to produce such poppet valves.

For example US 2016356186 proposes a valve, in which a valve body is provided with a cavity opening at an axial end. This cavity is closed by a valve cap, which is welded to the valve body. The weld is arranged in the axial end surface of the valve, such that the weld is directly subjected to the heat of the combustion process. This could result in fatigue of the weld and as a result leakage of the sodium in the hollow poppet valve into the cylinders of the combustion engine.

Other manufacturing methods are known, in which the valve head is formed as one piece. For example JP 1995208127 disclosed a method in which a hollow valve head is shaped out of a solid material. The resulting cavity, especially in the head itself, is very limited.

Also US 20120255175 discloses a method in which a rod with a blind hole is shaped into a poppet valve. Also with this method, the size of the cavity of the valve head is limited.

SUMMARY

In an embodiment, the present invention provides a poppet valve, in particular a hollow poppet valve, comprising: a valve stem; a valve body having along a longitudinal axis, a first end with a neck portion to which the valve stem is coaxially arranged and having along a longitudinal axis a second end with a first conical contact face portion, the valve body comprising a cavity with a first opening towards the first end and a second opening towards the second end; and a valve cap coaxially arranged to the valve body on the second end configured to close the second opening, the valve cap having a second conical contact face portion to form together with the first conical contact face portion a valve head contact face.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
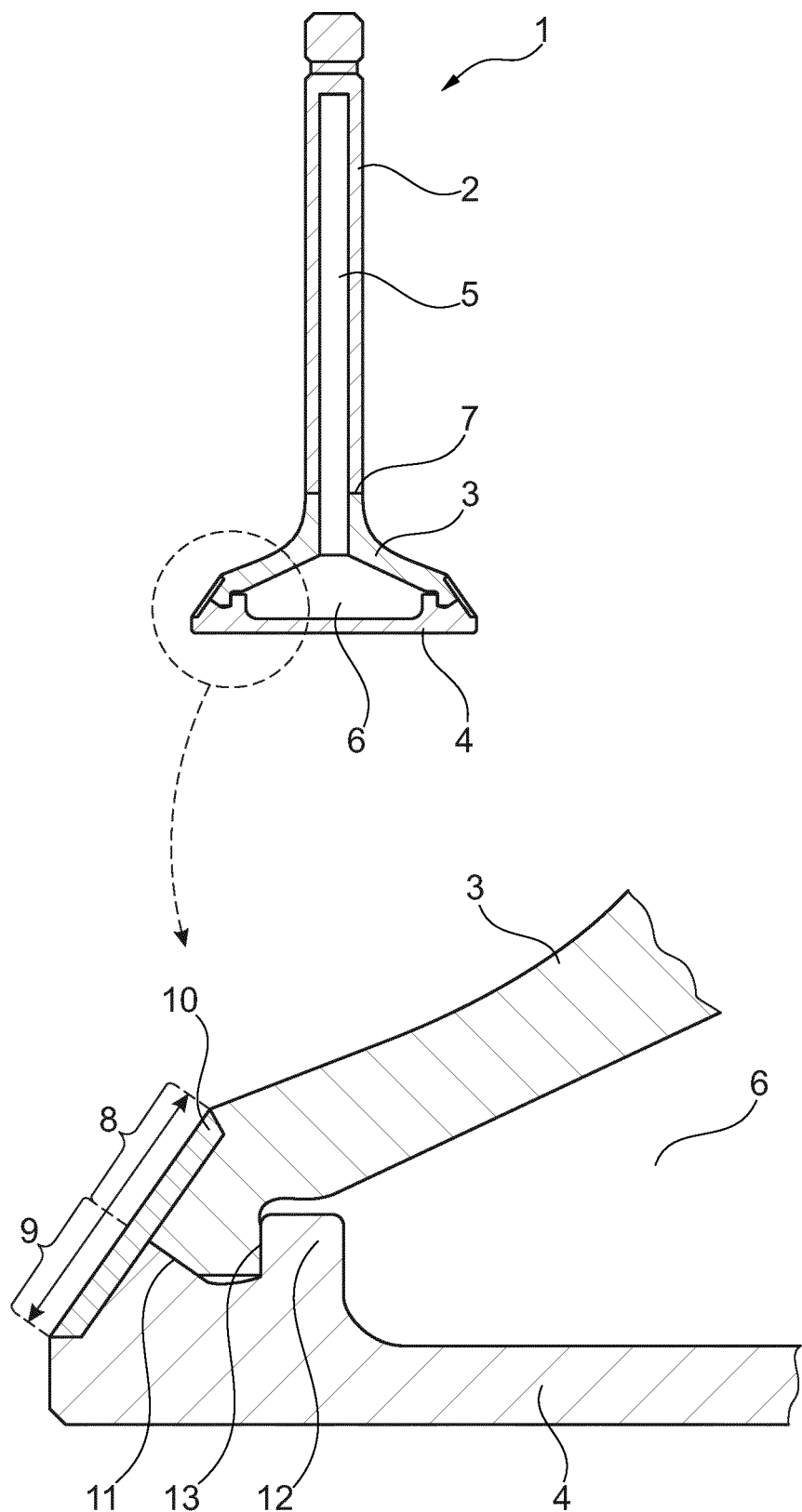
FIG. 1 shows a cross sectional view of an embodiment of a poppet valve according to the invention with an enlarged part of the valve head.

In an embodiment, the present invention reduces the above mentioned disadvantages.

In an embodiment, the present invention provides a poppet valve according to the invention, which poppet valve comprising:

a valve stem;

a valve body having along a longitudinal axis a first end with a neck portion to which the valve stem is coaxially arranged and having along a longitudinal axis a second end with a first conical contact face portion, wherein the valve body comprises a cavity with a first opening towards the first end and a second opening towards the second end;

a valve cap coaxially arranged to the valve body on the second end for closing the second opening, wherein the valve cap has a second conical contact face portion to form together with the first conical contact face portion a valve head contact face.

With the poppet valve according to the invention, the valve body is manufactured with a cavity having a second opening towards the second end. This second opening is closed by the valve cap. Because the valve cap provides for a second conical contact face portion, which forms together with the first conical contact face portion a valve head contact face, the partition surface between the valve body and the valve cap is no longer positioned in direct contact with the combustion process in the cylinder. This ensures that the impact of the combustion process onto the attachment between the valve body and the valve cap is lower, such that the chance on leakage of sodium or the like from the cavity is reduced.

In a preferred embodiment of the invention according to the invention both the first and second conical contact face portions comprise a circumferential groove portion to form together a circumferential face groove and wherein a layer of seat facing material, for example cobalt based or iron based, is arranged in the circumferential face groove.

The circumferential groove provides for a space to arrange a seat facing material and covering the partition surface, such that the partition surface between the valve body and the valve cap is shielded from any contact with the combustion process in the cylinder.

In a further preferred embodiment of the poppet valve according to the invention the valve cap is welded to the valve body, which weld is arranged between the first and second conical contact face portions.

In yet another embodiment of the poppet valve according to the invention the valve cap comprises a cylindrical upright wall, which extends into the second opening of the cavity and centers the valve cap relative to the valve body.

The upright wall allows for an easy positioning of the valve cap into the cavity of the valve body, but also provides for absorption of forces between the valve cap and the valve body, such that the weld between the valve body and valve cap is at least partially relieved from stresses between the valve body and the valve cap.

In still another embodiment of the poppet valve according to the invention the valve stem comprises a stem cavity with an opening connecting to the first opening of the cavity of the valve body.

With the stem cavity connected to the cavity of the valve body, the poppet valve is provided with a cavity extending through the whole poppet valve. This cavity can be filled with sodium or the like to enhance the heat transfer of the valve, with a reduction of the chance on leakage compared to prior art poppet valves.

In yet a further preferred embodiment of the poppet valve according to the invention the valve body further comprises a first annular contact face portion arranged coaxial with the longitudinal axis of the valve body and a first conical weld surface extending under an angle from the first conical contact face portion, wherein the first annular contact face portion transitions in radial outward direction into the first conical weld surface; and wherein the valve cap further comprises a second annular contact face portion arranged coaxial with the longitudinal axis of the valve cap and a second conical weld surface extending under an angle from the second conical contact face portion, wherein the second annular contact face portion abuts the first annular contact face portion and the first and second weld surfaces face each other.

The contact between both annular contact face portions ensure that any stresses between the conical weld surfaces and especially in the weld are reduced or even prevented.

Preferably, the radius of the outer edge of the first annular contact face portion is smaller than the radius of the outer edge of the second annular contact face portion, such that a space is formed between the first conical contact weld surface and the second annular contact face portion.

By providing a space between the first conical weld surface and the second annular face portion a space for any welding residual is provided, which avoids the starting of cracks in the weld.

The invention also relates to a method for manufacturing a poppet valve according to the invention, which method comprises the steps of:

providing a poppet valve as described herein, wherein the valve body is provided by machining and/or welding and/or forming;

welding the valve cap and valve body together by arranging a weld between the first and second conical contact face portions; and covering the weld by a layer of seat facing material.

In a preferred embodiment of the method according to the invention the weld is covered by a layer of seat facing material using plasma transferred arc welding. Plasma transferred arc welding allows for a variety of materials to be arranged in the circumferential face groove, especially for relative hard materials, which are very suited for a valve seat surface. Other options to arranged the layer of seat facing material are by laser welding and projection welding.

The FIG. 1 shows a poppet valve 1 with a valve stem 2, a valve body 3 and a valve cap 4.

The valve stem 2 has a cavity 5, which connects to a cavity 6 of the valve body 3 via a first opening at the first end 7 of the valve body 3. The second opening of the valve body 3 is closed by the valve cap 4.

The valve body 3 is provided along a longitudinal axis at a second end with a first conical contact face portion 8. The valve cap 4 is provided with a second conical contact face portion 9, with forms together with the first conical contact face portion 8 a valve head contact face.

Each conical contact face portion 8, 9 is provided with a groove portion, which accommodates a layer of seat facing material 10, which covers the weld 11 between the valve body 3 and the valve cap 4.

The valve cap 4 is provided with a cylindrical upright wall 12, which mates with a circumferential wall 13 of the cavity 6 and ensures that the valve cap 4 is centered relative to the valve body 3.

Figure 2:
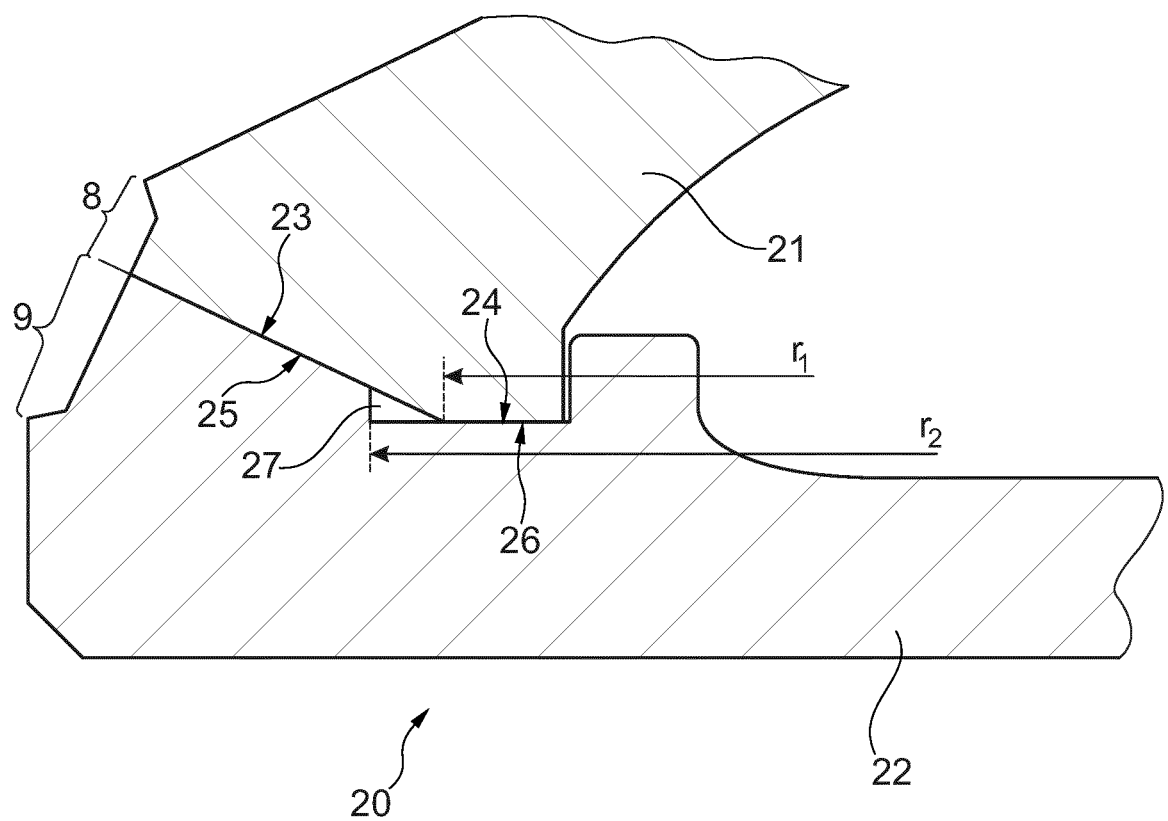
FIG. 2 shows a cross sectional view of a second embodiment of a poppet valve according to the invention.

FIG. 2 shows a poppet valve 20 with a valve body 21 and a valve cap 22. The valve body 21 has a first conical weld surface 23, which transitions into a first annular contact face portion 24. The valve cap 22 has a second conical weld surface 25 and a second annular contact face portion 26.

The outer radius $r_1$ of the first annular contact face portion 24 is smaller than the outer radius $r_2$ of the second contact face portion 26, such that a space 27 is provided between the first conical weld surface 23 and the second annular contact face portion 26.

The weld to attach the valve body 21 to the valve cap 22 is arranged between the first conical weld surface 23 and the second conical weld surface 25. Any residuals of the weld can flow into the space 27, preventing any cracks occurring the in the weld.

The first and second annular contact face portions 24, 26 furthermore reduce any stresses in the welding area.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A poppet valve, comprising:
    a valve stem;
    a valve body having along a longitudinal axis, a first end and a second end, the first end of the valve body having a coaxially arranged neck portion, the second end of the valve body having a first conical contact face portion;
    the valve body further comprising a cavity with a first opening disposed towards the first end and a second opening disposed towards the second end; and a valve cap coaxially arranged on the second end of the valve body, the valve cap configured to close the second opening of the valve body, the valve cap having a second conical contact face portion to form a valve head contact face with the first conical contact face portion; and the first conical contact face portion comprising a first circumferential groove portion forming a circumferential face groove with a second circumferential groove portion of the second conical contact face portion, wherein a layer of seat facing material is arranged in the circumferential face groove, and wherein the valve cap comprises a cylindrical upright wall, wherein the cylindrical upright wall extends into the second opening of the cavity of the valve body, and wherein the cylindrical upright wall is configured to center the valve cap relative to the valve body.

2. The poppet valve according to claim 1, wherein the valve cap is welded to the valve body, and wherein the weld is arranged between the first and second conical contact face portions.

3. The poppet valve according to claim 1, wherein the valve stem comprises a stem cavity with an opening connected to the first opening of the cavity of the valve body.

4. The poppet valve according to claim 1, wherein the valve body further comprises:
a first annular contact face portion arranged coaxially with the longitudinal axis of the valve body; and
a first conical weld surface extending under an angle from the first conical contact face portion,
wherein the first annular contact face portion transitions in a radially outward direction into the first conical weld surface,
wherein the valve cap further comprises a second annular contact face portion arranged coaxially with the longitudinal axis of the valve cap, and a second conical weld surface extending under an angle from the second conical contact face portion, and
wherein the second annular contact face portion abuts the first annular contact face portion and the first and second conical weld surfaces contact each other.

5. The poppet valve according to claim 4, wherein a radius of an outer edge of the first annular contact face portion is smaller than a radius of an outer edge of the second annular contact face portion, such that a space is formed between the first conical weld surface and the second annular contact face portion.

6. The poppet valve according to claim 1, wherein the layer of seat facing material is cobalt based or iron based.

7. A method for manufacturing a poppet valve, the method comprising the steps of: forming a valve stem;
forming a valve body having, along a longitudinal axis, a first end and a second end; forming the valve body to comprise a cavity with a first opening disposed towards the first end and a second opening disposed towards the second end;
forming the valve body to comprise a coaxially arranged neck portion at the first end of the valve body;
connecting the valve stem to the neck portion at the first end of the valve body;
forming the valve body to comprise a first conical contact face portion at the second end of the valve body;
forming the valve body such that the first conical contact face portion comprises a circumferential groove portion;

forming a valve cap configured to close the second opening of the valve body, the valve cap comprising a second conical contact face portion;
forming the valve cap such that the second conical contact face portion comprises a groove portion;
forming the valve cap such that the valve cap comprises a cylindrical upright wall, wherein the cylindrical upright wall extends into the second opening of the cavity of the valve body, and wherein the cylindrical upright wall is configured to center the valve cap to the valve body;
arranging the valve cap coaxially with the second end of the valve body such that the first and second conical contact face portions form a valve head contact face and, such that the circumferential groove portions of the first and second conical contact face portions join to form a circumferential face groove;
connecting the valve cap to the valve body by arranging a weld between the first and second conical contact face portions; and covering the weld along the circumferential face groove with a layer of seat facing material.

8. The method according to claim 7, further comprising affixing the layer of seat facing material using plasma transferred arc welding, laser welding, or projection welding.

9. The method for manufacturing the poppet valve of claim 8, wherein, during the formation of the valve cap, the method further comprises the steps of:
forming the valve cap to comprise a cylindrical upright wall,
wherein the cylindrical upright wall is configured to extend into the cavity of the second opening of the valve body, and
wherein the cylindrical upright wall is further configured to center the valve cap relative to the valve body.

10. The method for manufacturing the poppet valve of claim 7, wherein, during the formation of the valve stem, the method further comprises the steps of:
forming the valve stem to comprise a valve cavity with an opening; and
connecting the opening to the first opening of the cavity of the valve body.

11. The method for manufacturing the poppet valve of claim 7, wherein, during the formation of the valve body and the valve cap, the method further comprises the steps of:
forming the valve body such that it comprises both a first annular contact face portion arranged coaxially with the longitudinal axis of the valve body and a first conical weld surface which extends under an angle from the first conical contact face portion, wherein the first annular contact face portion transitions in a radially outward direction into the first conical weld surface;
forming the valve cap such that it comprises both a second annular contact face portion arranged coaxially with the longitudinal axis of the valve cap and a second conical weld surface which extends under an angle from the second conical contact face portion, and
positioning the valve body and valve cap such that the second annular contact face portion abuts the first annular contact face portion and the first and second conical weld surfaces contact each other when the valve body is connected to the valve cap.

12. The method for manufacturing the poppet valve of claim 11, wherein, during the formation of the valve body and the valve cap, the method further comprises the steps of:
forming the valve body and the valve cap such that a radius of an outer edge of the first annular contact face portion is smaller than a radius of an outer edge of the second annular contact face portion thereby forming a space between the first conical weld surface and the second annular contact face portion.

13. A hollow poppet valve comprising:
a valve stem;
a valve body comprising a longitudinal axis with a first end and a second end;
the valve body comprising a cavity with a first opening disposed at the first end of the valve body and a second opening disposed at the second end of the valve body;
the first end of the valve body comprising a coaxially arranged neck portion;
the second end of the valve body comprising a first conical contact face portion;
the valve body comprising a first annular contact face portion arranged coaxially on the longitudinal axis of the valve body and comprising a first conical weld surface extending at an angle from the first conical contact face portion;
wherein the first annular contact face portion transitions in an outward direction into the first conical weld surface;
a valve cap disposed coaxially on the second end of the valve body, the valve cap configured to seal the second opening of the valve body;
the valve cap comprising a second conical contact face portion;
the first conical contact face portion and the second conical contact face portion are joined to form a valve head contact face;
wherein the valve cap comprises a cylindrical upright wall, wherein the cylindrical upright wall extends into the second opening of the cavity of the valve body, and wherein the cylindrical upright wall is configured to center the valve cap to the valve body;
the valve cap further comprises:
a second annular contact face portion arranged coaxially with the longitudinal axis of the valve cap; and
a second conical weld surface extending at an angle from the second conical contact face portion;
wherein the second annular contact face portion abuts the first annular contact face portion, and
wherein the first conical weld surface contacts the second conical weld surface.

14. The hollow poppet valve of claim 13, wherein an outer edge of the first annular contact face portion has a smaller radius than an outer edge of the second annular contact face portion, such that a space is formed between the first conical weld surface and the second annular contact face portion.

15. The hollow poppet valve of claim 13, wherein the first conical contact face portion comprises a first circumferential groove portion, wherein the second conical contact face portion comprises a second circumferential groove portion, and wherein the first circumferential groove portion forms a circumferential face groove with the second circumferential groove portion.

16. The hollow poppet valve of claim 14, wherein a layer of seat facing material is arranged in the circumferential face groove.

17. The hollow poppet valve of claim 13, wherein the valve stem comprises a stem cavity with an opening connected to the first opening of the cavity of the valve body.

18. A poppet valve, comprising:
a valve stem;
a valve body having along a longitudinal axis, a first end and a second end,
the first end of the valve body comprising a coaxially arranged neck portion,
the second end of the valve body comprising a first conical contact face portion;
the valve body further comprising a cavity with a first opening disposed towards the first end and a second opening disposed towards the second end; and
a valve cap coaxially arranged on the second end of the valve body, the valve cap configured to close the second opening of the valve body;
wherein the valve cap comprises a cylindrical upright wall, wherein the cylindrical upright wall extends into the second opening of the cavity of
the valve body, and wherein the cylindrical upright wall is configured to center the valve cap to the valve body;
the valve cap comprising a second conical contact face portion forming a valve head contact face with the first conical contact face portion;
the first conical contact face portion comprising a first circumferential groove portion and the second conical contact face portion comprising a second circumferential groove portion, the first circumferential groove portion and the second circumferential groove portion forming a circumferential face groove in the poppet valve.

* * * * *